Dec. 9, 1930.    M. MASTERSON ET AL    1,784,104
LEAK PREVENTING SEAL
Filed Feb. 23, 1926
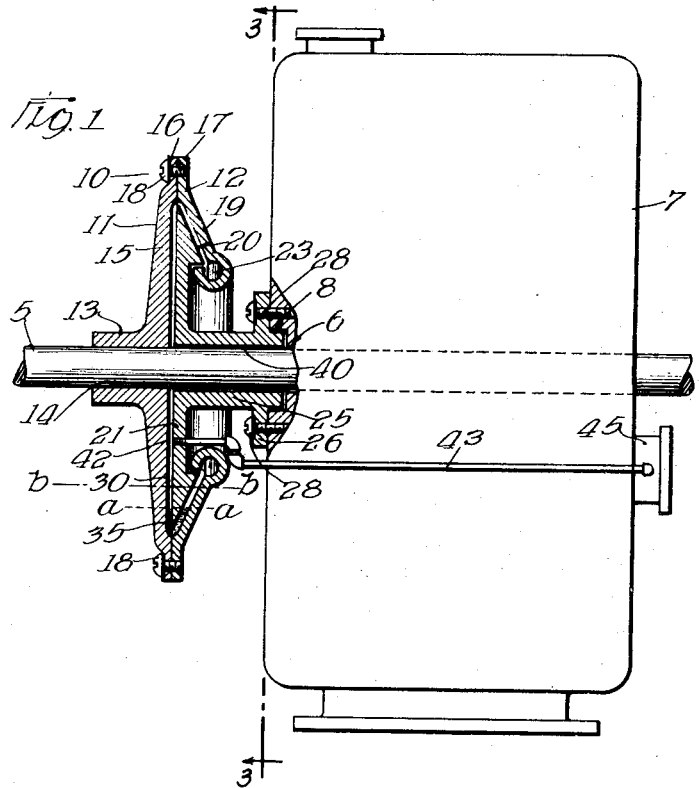
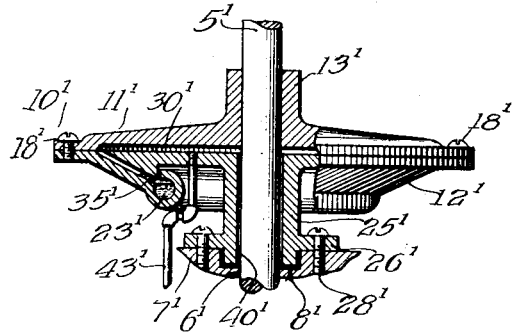
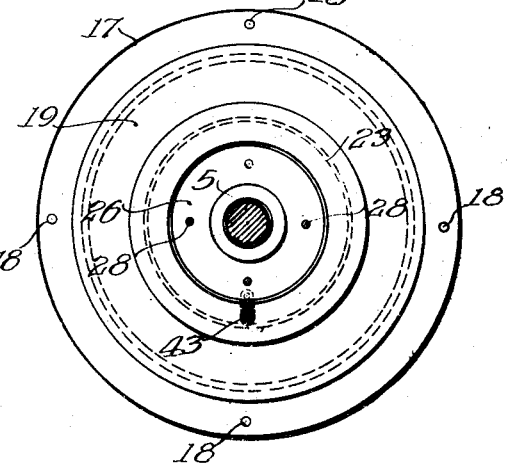
Witnesses:
William P. Kilroy
Harry C. White
Inventors
Meckley Masterson,
Orville Markel.
By Brown Boettner Dieemer
Attys.

Patented Dec. 9, 1930

1,784,104

UNITED STATES PATENT OFFICE

MECKLEY MASTERSON AND ORVILLE MARKEL, OF CHICAGO, ILLINOIS

LEAK-PREVENTING SEAL

Application filed February 23, 1926. Serial No. 90,000.

This invention relates to an improved leak preventing seal, and although particularly adapted for preventing leaking along the shafts of pumps, turbines and the like, and for forming a fluid tight joint between a rotating shaft and a casing or the like through which the shaft projects, the invention is not to be limited to any particular use or purpose but may be employed wherever found desirable.

Packing glands are customarily used for this purpose, but the results secured where packing material is held about the shaft are not satisfactory. In fact it is practically impossible to provide a shaft that will run perfectly true, that is a shaft having an absolutely true center or axis of rotation throughout the length. Where a packing gland is employed any eccentricity in the shaft will make an opening through the packing larger than the diameter of the shaft itself. Consequently the packing does not pack or bear uniformly on the shaft and leakage results. The resiliency of the packing material itself will not compensate for such eccentricity, especially where the speed of rotation of the shaft is fairly high. Furthermore in devices of this sort the packing must be frequently renewed.

The object of our invention is to more effectively prevent leakage along the shaft or other rotating part and to this end we provide for sealing the shaft without the use of packing and more particularly by an improved liquid seal.

Another object is the provision of a device of this sort that may be conveniently embodied in existing structures and a generally improved and simplified construction that may be economically produced and conveniently substituted for the packing glands now customarily employed.

According to our invention we direct any leakage radially from the periphery of the shaft and we seal the radial path by an annular liquid seal. The sealing liquid may be suitably carried, as by means of a casing mounted on the shaft and it is thrown into sealing position centrifugally upon rotation of the shaft. We also provide for returning the sealing liquid to the bottom of the casing when the shaft is stopped and for withdrawing any leakage from the casing as desired.

The invention is illustrated in the accompanying drawing, in which

Fig. 1 is an axial section through a seal embodying our invention, showing a shaft sealed thereby and a casing from which the shaft projects.

Fig. 2 is a similar view showing the device partially in elevation and arranged on a vertical shaft and Fig. 3 is a vertical section taken on the line 3—3 of Fig. 1.

Referring first to Fig. 1 the shaft 5 projects through a bore or opening 6 provided in the casing 7 which may be the casing of the pump, turbine or other device with which the invention is employed. The casing 7 is shown as recessed or counterbored at 8. This counterbore 8 may be relatively shallow or it may be the usual stuffing or packing box now commonly provided where packing glands are employed.

Fixed upon the shaft 5 to rotate therewith is a casing 10 comprising two parts 11 and 12. The part 11 has a hub or sleeve 13 which may be shrunk or pressed upon the shaft at 14 or otherwise fixed upon the shaft for rotation therewith. Extending radially from the sleeve 13 is a disc-like wall 15 which may be dished to provide a marginal flange 16.

The other part 12 has a similar co-operating marginal flange 17 and the opposing surfaces of the flanges 16 and 17 are finished off normal to the axis of shaft 5 and clamped tightly together at 18 and against liquid leakage therebetween. The wall 19 of part 12 is inclined to parallel the correspondingly inclined or slanting surface or eave 20 provided on the stationary disc 21 and which guides the flow of the sealing liquid into the annular or circular cavity or pocket 23 formed on part 12, as by providing a rolled back formation about the inner edge of wall 19.

The stationary disc 21 has a hollow sleeve or hub 25 which may loosely surround the shaft 5 and has a radial flange 26 adjacent but spaced from its inner end. The inner projecting end of the sleeve 25 fits in the counterbore or stuffing box 8 and the flange 26 the casing surface of which may be finished off normal to the axis of shaft 5 is clamped tightly and in a fixed position to the body or casing 7, as by means of suitable bolts 28.

The inner radial surface of the casing part 11 lies substantially normal to the axis of the shaft 15 and substantially parallels the adjacent radial surface of the stationary disc 21 with a space 30 therebetween, through which space 30 the sealing liquid employed is conveyed to the bottom of the casing 10 when the shaft stops turning.

In use the sealing liquid, preferably mercury is introduced into the annular or circumferential pocket defined by casing parts 11 and 12. When the device is started and the shaft 5 rotates, the casing rotates with it and when the casing revolves at a proper speed the sealing liquid 35 is thrown or distributed in an annular ring around the inside of the casing to substantially the depth a—a annularly thereabout. When the shaft and casing are rotating with the liquid 35 in its annular position about the inside of the casing the edge or margin of the stationary disc 21 extends about its periphery into this annular liquid ring so that any leakage from the space 30 to the space between the inclined wall 19 of part 12 and the adjacent surface of disc 21 would have to pass through this annular liquid ring which thereby forms a liquid seal and prevents any leakage along the shaft from escaping therefrom when the shaft is in action.

When the shaft is in motion the annular ring of liquid 35 lies partially in the space 30 and partially in the space between the casing part 12 and disc 21 and when the shaft stops turning the liquid is conveyed through space 30 and through the space between part 12 and disc 21 and pocket 23 back to the bottom of the casing 10.

Shaft 5 may pass relatively loosely through the sleeve 25 of the disc 21 and any leakage that occurs along the space 40 to the space 30 between the casing part 11 and the disc 21 may be withdrawn through an opening 42 in the stationary disc 21 and a pipe or conduit 43 leading therefrom. The conduit or pipe 43 may return this leakage to the suction side of the pump at 45, for example where the invention is embodied in a pump, thereby equalizing the thrust at the suction end of the pump and automatically preventing contact and friction between the disc and the casing. The line b—b shows substantially the level of the liquid seal when the shaft 5 is not rotating.

The device shown in Fig. 2 is substantially identical with that shown in Fig. 1 and the parts are therefore designated by primed reference characters corresponding to those employed in Fig. 1. In this case, however, the device is shown partially in elevation and upon a vertical shaft, in which case when rotation of the shaft is stopped the sealing liquid 35' is dropped into the pocket 23' which is now disposed at the bottom instead of at one end as before. In operation the liquid 35' as before is thrown out centrifugally and forms an annular sealing ring about the inside of the casing 10'.

From the foregoing it will now be apparent that we provide an effective seal without the use of packing material and that the device is simple and adapted to be conveniently embodied, in place of the packing glands now in use by simply inserting the inner projecting end of the sleeve of the stationary disc 21 in the usual stuffing box and clamping the flange 26 to the casing 7 with the other parts in their proper associated relation.

We do not intend to be limited to the precise details shown or described.

We claim:

In combination, a housing having a recess, a horizontal rotatable shaft extending therefrom, a sleeve surrounding the shaft, said sleeve having a radial flange attached to the housing and a hub extending into said recess, a disc projecting radially from the sleeve, and a casing mounted upon said shaft and peripherally surrounding said disc, said casing being adapted to hold a liquid seal and permit disposal of same in an annular ring about the interior of said casing and about the periphery of the disc upon rotation of the shaft, together with means for automatically returning leakage from the housing into the radial space back to the housing.

In witness whereof, we hereunto subscribe our names this 18th day of February, 1926.

MECKLEY MASTERSON
ORVILLE MARKEL.